Nov. 11, 1952

L. G. BROWN 2,617,189

GRASS TRIMMING TOOL

Filed Dec. 21, 1951

Lemuel G. Brown
INVENTOR,

BY
Bernard P. Miller
ATTORNEY

Nov. 11, 1952 — L. G. BROWN — 2,617,189
GRASS TRIMMING TOOL
Filed Dec. 21, 1951 — 2 SHEETS—SHEET 2

Lemuel G. Brown
INVENTOR.

BY Bernard P. Miller
ATTORNEY

Patented Nov. 11, 1952

2,617,189

UNITED STATES PATENT OFFICE 2,617,189

GRASS TRIMMING TOOL

Lemuel G. Brown, Oklahoma City, Okla.

Application December 21, 1951, Serial No. 262,743

4 Claims. (Cl. 30—206)

The present invention relates to electrically driven tools for trimming grass, and more particularly, to trimming tools which are manipulated by hand.

An important object of the invention is to provide a handy light-weight hand tool for edging lawns around flower beds, and along walks and buildings.

A further object is to provide a tool of this class, which is so designed that it may be supported and manipulated with one hand.

An additional object is to provide a trimming tool which will efficiently trim grass along a building foundation, without any danger of injuring the cutting blade of the tool.

Another object is to provide a tool of this class having a rotary cutting blade, and embodying an efficient guard for preventing the fouling of the blade shaft by mowed grass particles, and the like.

A still further object is to provide an edging tool of this class which is comparatively cheap to manufacture, and which has few moving parts to become worn or to get out of order.

Other objects will be apparent from the following description when taken in conjunction with the accompanying two sheets of drawings, wherein.

Like characters of reference designate like parts in those figures of the drawings in which they occur.

In the drawings.

Figure 1:
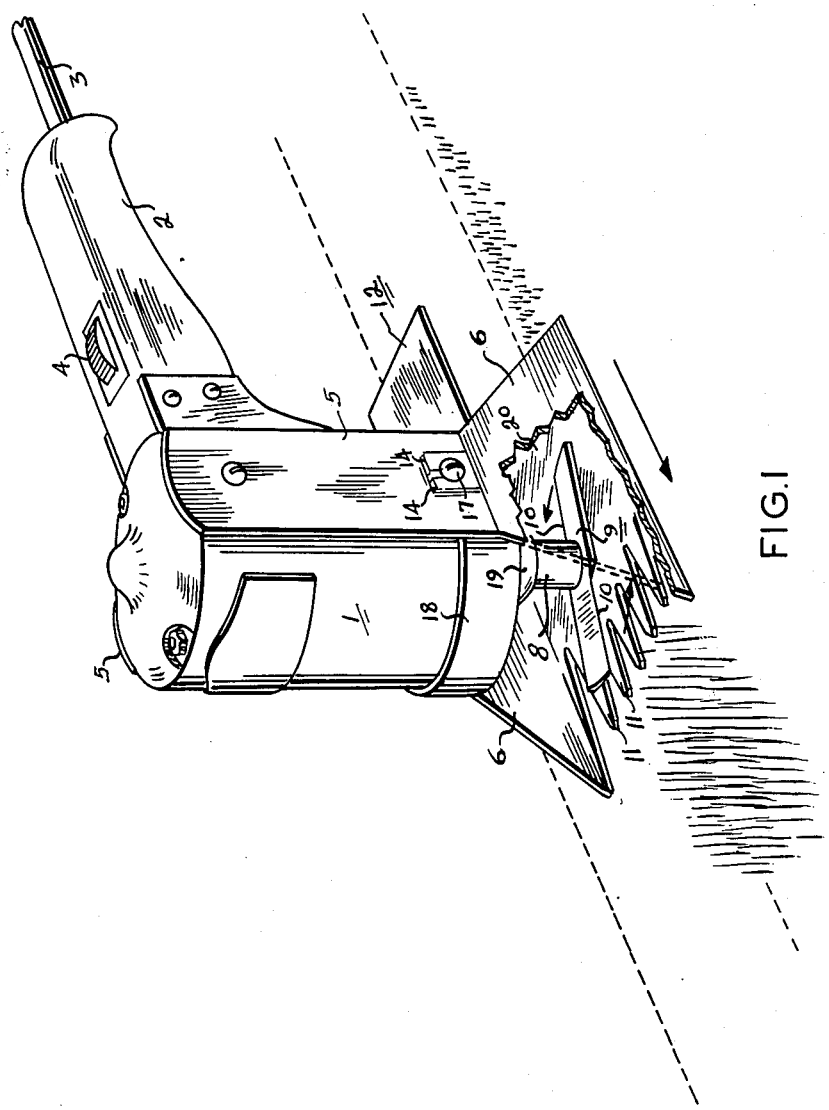
Figure 1 is a perspective view of the device.

The device consists substantially of an electric motor housing 1 having flattened opposite side surfaces extending from top to bottom thereof. A laterally projecting handle 2 is provided on the housing 1, and the handle houses an electric conduit 3 supplying electromotive power to a conventional motor within the housing. A thumb operated switch 4 is provided on the handle for making and breaking the electrical circuit to the motor.

To each flattened side of the motor housing 1, there is rigidly attached a substantially rectangular plate 5 having a depending outwardly slanting sheet metal skirt or shoe 6, which is triangular in general configuration.

The motor, not shown, but which is operatively contained in the housing 1, has a depending shaft 7, and an extension 8 of said shaft.

The lower end of the shaft extension 8 rigidly supports a transverse cutting blade 9, which is rotatable with the shaft extension 8, and the leading edges 10 which are sharpened for cutting purposes.

Between the lower parallel edges of the two skirts 6, there is rigidly mounted a flat horizontal plate 20 of sheet metal having a plurality of spaced forwardly extending fingers 11 across its leading or forward end.

Figure 3:
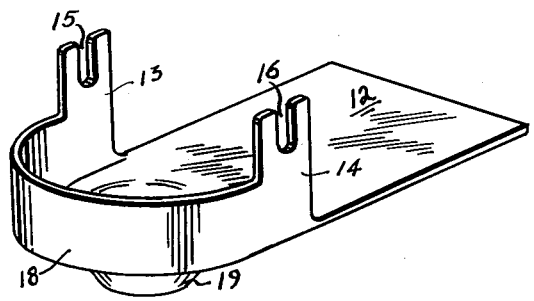
Figure 3 is a perspective view of a shaft-guarding unit which forms a part of the device.
Figure 2:
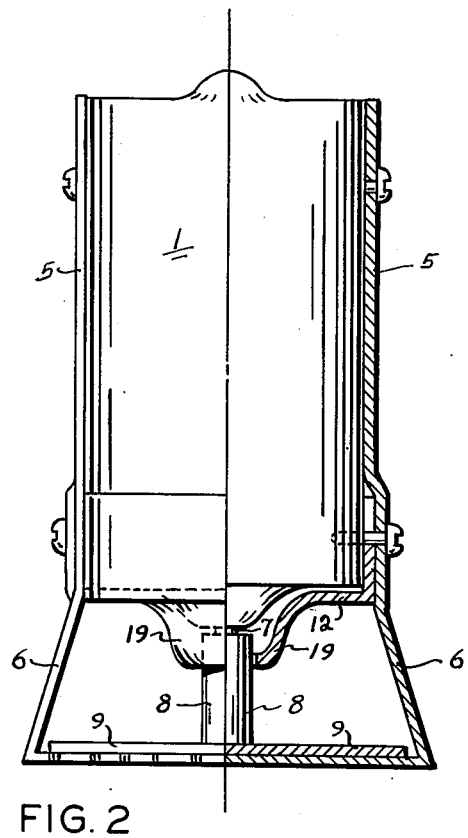
Figure 2 is a front elevational view, partially in vertical section.

The device further includes a flat sheet metal panel or guard-plate 12 (Fig. 3), said plate having two upstanding attaching ears 13 and 14 which are bifurcated by slots 15 and 16 in their upper ends. The ears 13 and 14 are adapted to be thrust upwardly between the plate 5 and the flattened portion of the motor housing, and to be held in place by studs 17. An arcuate band portion 18 extends between the two ears 13 and 14, and is bowed to coincide with the periphery of the motor housing 1. Between the ears 13 and 14, the plate 12 is extruded downwardly to form a cup-section 19, and the bottom of this cup-section is perforated to closely envelop the motor shaft extension 8. The plate 12, and its shaft surrounding cup-portion 19 acts to prevent grass from winding upon the rotating shaft extension 8.

It is pointed out that the tool may be used on grass pretty much in the same manner that a barber uses his hair clippers. The device will trim grass which is lying directly against a vertical wall (like a building foundation), and because of the guard skirts 6, the cutting blade 9 cannot contact such wall. The tool can be used along the edges of a concrete side-walk, without injury to the blade, regardless of the angle at which the motor shaft extension 8 is tilted, because of the presence of the skirts 6 and the guard plate 20.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A grass trimming tool for hand manipulation including: a hollow cylindrical housing having an electric motor operatively contained therein, said motor having a driven shaft projecting beyond one end of the housing; a grass cutting blade anchored to the outer end of said shaft; straight diverging blade-guarding skirts attached to opposite sides of the housing and projecting therefrom beyond the plane of the cutting blade, the outer edges of said skirts lying in parallel relation to each other; a flat panel rigidly positioned between said skirt edges adjacent but outside of the plane of said blade; spaced apart grass engaging fingers formed in the end of said panel and presented in a forward direction, said fingers extending forwardly beyond the sweep of said blade; a stationary plate rigidly positioned between said skirts in parallel relation to said panel, said plate located between the blade and the nearest end of the housing; and a convex protuberence formed in the plate and closely surrounding said shaft to prevent the fouling of grass with the motor shaft and motor.

2. A grass trimming edging tool for hand manipulation, including: an upright cylindrical housing having an electric motor therein with a depending driven shaft projecting beyond the lower end of the housing; a cutting blade anchored to the lower end of the shaft; straight diverging blade-guarding skirts attached to and depending from opposite sides of the housing, said skirts having their lower edges parallel to each other and located below the plane of said cutting blade; a flat horizontal panel rigidly positioned between the lower edges of the two skirts, said panel being proximate to the lower face of said blade; spaced apart grass engaging fingers carried by the front edge of said panel, said fingers presented in a forward direction, and extending forwardly beyond the sweep of said blade; a stationary horizontal plate between said skirts above the blade and beneath the housing; and a convex protuberance closely surrounding the shaft and depending from the plate for preventing the fouling of grass with the motor shaft and motor.

3. Structure as specified in claim 1, in which the skirts, the panel, and the guard plate combine to form an elongated channel through which mowed grass is discharged rearwardly by movement of the blade.

4. Structure as specified in claim 2, in which the skirts, the panel, and the guard plate combine to form an elongated channel through which mowed grass is discharged rearwardly by movement of the blade.

LEMUEL G. BROWN.

No references cited.